United States Patent
McIntier

[15] 3,652,076
[45] Mar. 28, 1972

[54] MOLDING APPARATUS

[72] Inventor: Edwin Ralph McIntier, Madison, Conn.
[73] Assignee: Richard G. Sweitzer, Madison, Conn.
[22] Filed: Mar. 16, 1970
[21] Appl. No.: 19,881

[52] U.S. Cl. ............................269/24, 249/48, 249/219 R, 269/26, 18/43, 269/46, 269/56
[51] Int. Cl. .........................................................B23q 3/08
[58] Field of Search ............249/48, 49, 44, 164, 194, 219 R; 18/43; 25/130 B; 269/24, 26, 46, 56

[56] References Cited

UNITED STATES PATENTS

| | | |
|---|---|---|
| 3,260,493 | 7/1965 | Beckman ..................................249/48 |
| 3,193,880 | 7/1965 | Capistrant et al. ................25/130 B X |
| 2,903,777 | 9/1959 | Mitchell ..............................25/130 B |
| 3,542,914 | 11/1970 | La Vergne ..........................249/144 X |
| 2,443,059 | 6/1948 | Venard ................................249/164 X |
| 1,109,810 | 9/1914 | Wilson ................................249/164 X |
| 3,316,593 | 5/1967 | Neumann..............................18/43 X |
| 3,323,173 | 6/1967 | Poyner..................................18/43 X |
| 3,394,434 | 7/1968 | Hart-Still ............................18/43 X |
| 3,368,251 | 2/1968 | Williams ............................249/48 X |
| 3,255,990 | 6/1966 | Williams ............................249/48 X |
| 985,661 | 2/1911 | Connors ...............................249/48 |

*Primary Examiner*—J. Howard Flint, Jr.
*Attorney*—Roberts, Cushman & Grover

[57] ABSTRACT

Molding apparatus comprising a mold support, a jacket for the mold, the jacket comprising separate plates for the sides of the mold, the plates having out-turned flanges at the corners of the mold, the flanges at each corner being spaced apart, a fluid-operated clamp at each corner of the jacket for drawing said flanges together. Suspension means movably suspends the jacket over a mold on said support so that the jacket may be lowered over the mold, and fluid is simultaneously admitted to the clamps at the corners of the mold.

6 Claims, 7 Drawing Figures

PATENTED MAR 28 1972 3,652,076
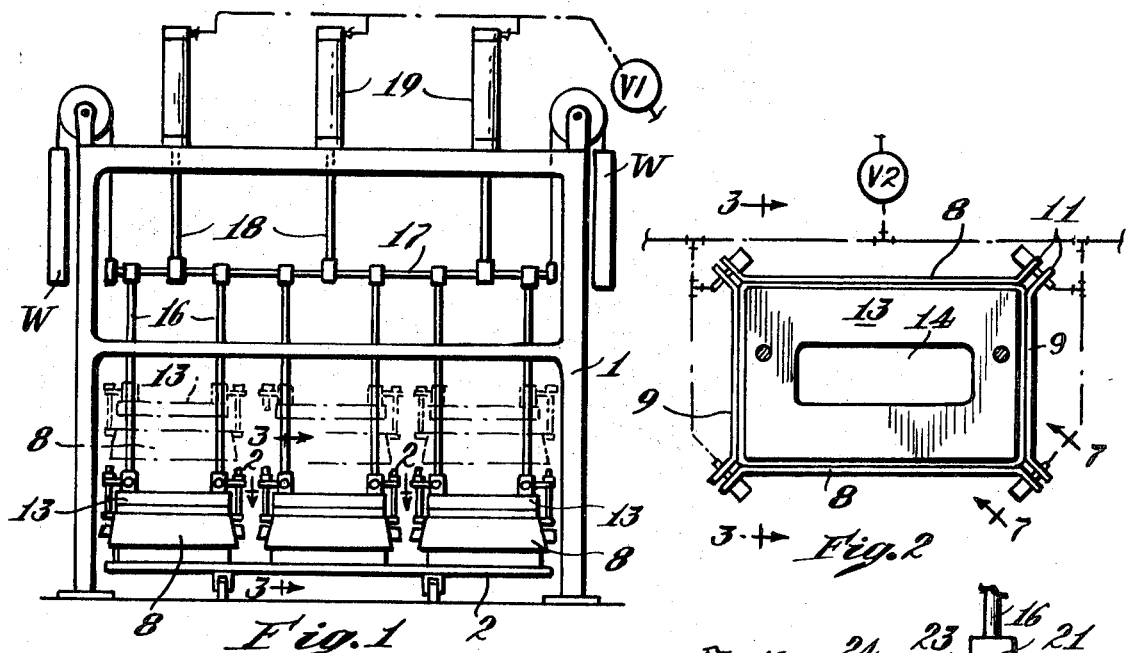
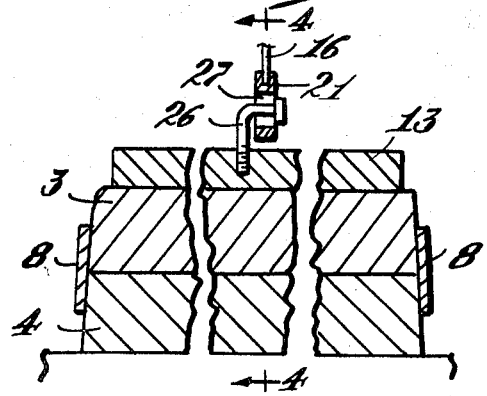
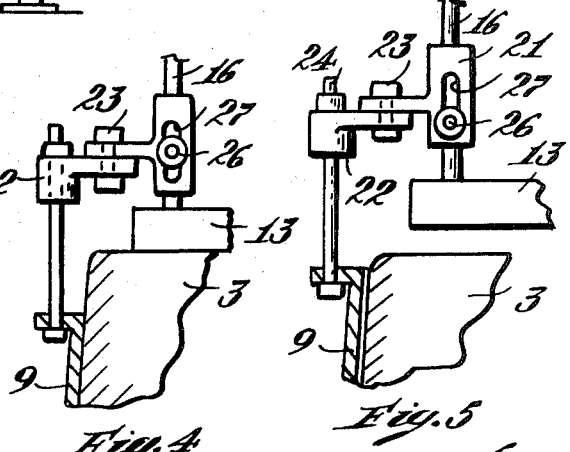
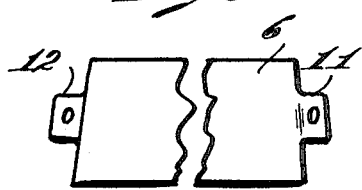
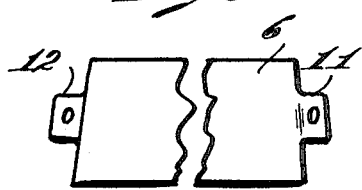
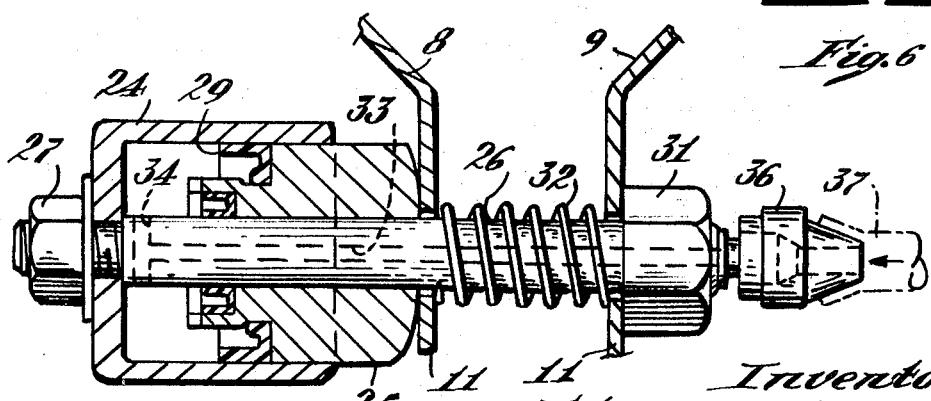
Inventor
Edwin Ralph McIntier
by Roberts Cushman & Grover
Attys

MOLDING APPARATUS

Objects of the invention are to produce apparatus which is simple and economical to produce, which can be operated easily and rapidly, which produces uniform results and which is durable and reliable in use.

According to this invention the apparatus comprises a mold support, a jacket for the mold, the jacket comprising separate plates for the sides of the mold, the plates having opposed surfaces at the corners of the mold, the surfaces at each corner being spaced apart, means for pressing each plate against its side of the mold, suspension means for movably suspending the jacket over a mold so that it may be lowered around the mold, and means for simultaneously energizing said means. Preferably said first means comprises a fluid-operated clamp at each corner of the mold, said surfaces are on approximately parallel flanges, the flanges have aligned openings, and the clamps extend through the openings. For a mold which flares from top to bottom the plates are trapezoidal to correspond to the shape of the mold. In the preferred embodiment the apparatus has a weight for the mold, and lost-motion means for supporting the weight on said suspension means so that after the weight engages the mold the jacket continues into engagement with the mold, whereby the jacket automatically adjusts to molds of slightly different dimensions. Preferably the apparatus also has fluid-operated means for lifting said suspension means and a counterweight for said jacket and weight.

For the purpose of illustration a typical embodiment of the invention is shown in the accompanying drawings in which FIG. 1 is a front elevation;

FIG. 2 is a section on line 2—2 of FIG. 1;

FIG. 3 is a section on line 3—3 of FIGS. 1 and 2;

FIG. 4 is a section on line 4—4 of FIG. 3 showing the jacket and weight in lowered position;

FIG. 5 is a similar section showing the jacket and weight starting toward raised position;

FIG. 6 is a side elevation of one of the jacket plates; and

FIG. 7 is a section on line 7—7 of FIG. 2 showing the pneumatic clamp in detail.

The particular embodiment of the invention chosen for the purpose of illustration comprises a frame 1 and a dolly 2 supporting three molds comprising upper and lower parts 3 and 4. While pouring the molds it is customary to surround them with jackets.

According to the present invention each jacket comprises four plates 8 and 9 corresponding to the shape of the four sides of the mold. At the corners of the mold the plates have opposed flanges with openings 12 for clamps. The flanges at each corner are spaced apart so that when drawn together with clamps the plates fit snugly against the sides of the mold. As shown at 13 the usual weight holds the top of the mold against the bottom while the mold is being poured through an opening 14 (FIG. 2).

The jackets and weights are supported by suspension means comprising vertical rods 16, crossbar 17 and piston rods 18 leading to pistons in the cylinders 19. When in lowered operative position the parts are in the position shown in FIGS. 1 to 4 and when in raised position the jackets and weights are in the broken-line position shown in FIG. 1. Preferably the suspension means is counterbalanced by weights W which normally hold the suspension means in raised position. To lower the jackets and weights to operative position air is admitted to the cylinders 19 by means of a valve V1.

The jackets are supported on the rods 16 by means of brackets 21 and 22 and bolts 23 and 24. The weights are supported on the brackets 21 by means of L-shaped arms 26 extending through slots 27 in the brackets 21. When the suspension means is raised the arms 26 rest in the bottom of the slots 27 as shown in FIG. 5. As the suspension means is lowered to the operative position shown in FIGS. 3 and 4 the weights 13 contact the mold before the jackets. Then as the suspension means continues downwardly the jacket continues downwardly and the jacket plates move into contact with the sides of the mold. While the suspension means may be either raised or lowered by the pneumatic means, as shown in FIG. 1 the suspension means is lowered by the pneumatic means and raised by the counterweights W.

The preferred means for clamping the plates against the sides of the mold is shown in FIG. 7 and is claimed in copending application, Ser. No. 19,880 filed on even date herewith. It comprises a cylinder 24, a piston 25, a rod 26 secured to one end of the cylinder with a nut 27 and projecting from the other end of the cylinder. The piston is slidable on the rod 26 and is provided with suitable packing material as indicated at 29. Threaded on the outer end of the rod 26 is a nut 31 and extending between the piston and nut is a compression spring 32. The rod 26 has an axial opening 33 leading to a transverse opening 34 at the inner end of the rod. The outer end of the rod carries a nipple 36 for attachment to an air hose 37.

In use the nut 31 and nipple 36 are removed and the portion of the rod between the piston 25 and nut 31 is inserted through the openings 12 in the flanges 11 of the jacket plates. After the clamp is positioned air is admitted simultaneously to all of the cylinders through openings 33 and 34, thereby forcing the piston 25 toward the nut 31 to clamp the flanges 11 therebetween. As shown in FIG. 2 air is admitted simultaneously to all of the clamps by means of a valve V2. When fluid pressure is released the spring 32 returns the piston 25 to retracted position at the inner end of the cylinder.

I claim:

1. Molding apparatus comprising a mold support, a jacket for the mold, the jacket comprising separate plates for the sides of the mold, the plates having opposed surfaces at each of the corners of the mold, the surfaces at each corner being spaced apart and having fluid-operated clamping means coupled thereto, and means for supplying fluid under pressure to said clamping means for simultaneously actuating all of said clamping means to press each plate against its side of the mold, suspension means for movably suspending the jacket over a mold, means for moving said suspension means toward the mold to lower said jacket around the mold, means for actuating said suspension moving means and means for subsequently energizing said fluid supplying means.

2. Apparatus according to claim 1 wherein said actuating means is fluid operated.

3. Apparatus according to claim 1 wherein said surfaces comprise out-turned flanges which are approximately parallel and have aligned openings through which said clamping means extend.

4. Apparatus according to claim 1 wherein said suspension means further includes weight means adapted to engage the mold when said suspension means is moved toward the mold, and lost-motion means for supporting said weight means on said suspension means so that after said weight means engages the mold the jacket continues into engagement with the mold.

5. Apparatus according to claim 4 wherein said actuating means is a fluid-operated means for moving said suspension means toward the mold.

6. Apparatus according to claim 5 and further including counterweight means cooperatively connected with said suspension means for maintaining said suspension means in a position away from said mold when said suspension moving means is not actuated.

* * * * *